United States Patent
Tweedt

[11] Patent Number: 5,226,755
[45] Date of Patent: Jul. 13, 1993

[54] ANGLE BRACKET FOR ATTACHMENT OF METAL STUDS

[76] Inventor: Dennis Tweedt, P.O. Box 89412, Honolulu, Hi. 96830-9412

[21] Appl. No.: 867,438

[22] Filed: Apr. 13, 1992

[51] Int. Cl.$^5$ .................................................. F16B 1/00
[52] U.S. Cl. ...................................... 403/205; 52/287; 248/300
[58] Field of Search .................. 403/403, 205, 382; 52/287, 288, 238.1, 239, 241, 282; 248/300

[56] References Cited

U.S. PATENT DOCUMENTS

| | | | |
|---|---|---|---|
| 1,867,107 | 7/1932 | Schmidt, Jr. | 403/205 |
| 3,323,264 | 6/1967 | Cross | 52/288 X |
| 3,483,665 | 12/1969 | Miller | 52/282 X |
| 3,989,397 | 11/1976 | Baker | 403/205 |
| 4,385,850 | 5/1983 | Bobath | 403/205 |
| 4,527,370 | 7/1985 | Schuette | 52/282 |
| 4,557,091 | 12/1985 | Auer | 52/282 |
| 4,712,942 | 12/1987 | Brown | 403/231 X |
| 5,105,594 | 4/1992 | Kirchner | 52/282 X |

Primary Examiner—Ramon O. Ramirez
Attorney, Agent, or Firm—Frank D. Gilliam

[57] ABSTRACT

A friction fit mounting bracket for use in construction of structures employing metal stud frames which when joined form an angled relationship. The friction fit mounting bracket is formed to receive the longitudinal edge of adjacent metal studs in a friction held relationship for position and holding those studs in a vertical relationship at a selected angle therebetween. One embodiment of the mounting bracket includes a multi-part structure formed from metal or plastic.

5 Claims, 1 Drawing Sheet

ANGLE BRACKET FOR ATTACHMENT OF METAL STUDS

BACKGROUND OF THE INVENTION

The invention relates generally to wall board construction used in erecting of plasterboard wall structures and the like from metal stud structures and particularly to the joining of angled segments of metal stud wall frame structures and is in the nature of an improvement to this type of construction.

A corner stay is taught in U.S. Pat. No. 825,523 issued to Henry H. Dewey on Jul. 10, 1908 for use in connecting two adjacent walls of boxes or trunks positioned at 90°. There is no teachings in the Dewey patent for use at other angles other than 90°. There is no teaching for the interconnecting of studs but rather only panel sections. The Dewey corner stay is undesirable for use in modern construction methods because studded wall structures are enclosed by wall board or the like and outer surfaces of the corner stays of Dewey are not smooth for receiving an over lay structure. Further, Dewey teaches securing the corner stay to the panels.

A method for interconnection panels at various angles including obtuse angles is taught by U.S. Pat. No. 4,297,940 issued to Truman D. Hainline on Nov. 3, 1981 for joining pairs of adjacent wall panels filled with sound absorbing material. "U" shaped end caps are attached to the adjacent wall panels and are connected together along at least one edge. The end attachment of the adjacent wall panels and end caps attachment thereto require considerable assembly at the job sight and when completed have a considerable difference in surface elevation between the outer edge of the end caps and the adjacent walls. This space is not suitable for the purpose intended for use of the pre-assembled bracket of the invention, namely, to provide a smooth plaster wall surface after adjacent wall joiner.

Various other means and methods of interconnecting wall panels and the like at 90° or 180 are taught by U.S. Pat. Nos. 2,363,164; 3,206,806; 3,349,533; 3,962,840; 3,995,402; 4,147,001, and 4,254,600. None of these references are directed to the joining of adjacent metal studs or the positioning of adjacent studs at angles between 90° and 180°.

There has not been provided a novel construction bracket designed to hold two adjacent metal studs at a selected angle therebetween of other than 90° and 180° until the emergence of the present invention.

SUMMARY OF THE INVENTION

According to the present invention this is achieved by providing a novel pre-assembled bracket which includes channels or sockets each for receiving the adjacent slides of upright metal studs. The channels or sockets are interconnected whereby the stud abutting surfaces of each adjacent stud is positioned with a selected angle therebetween. One outer or face surface of the bracket encloses the space between the non contacting edges of the abutting studs to provide a smooth continuous surface for the attachment of wall board or paneling to the stud overlay and bracket.

The pre-assembled bracket of the invention is constructed of either thin metal such as sheet metal, galvanized iron or the like, thin plastic, etc. The bracket can be formed of very thin material as it is not required to encounter force but merely to support the metal studs in an upright vertical position while installing plasterboard, wall paneling or the like.

The abutting surfaces of the plasterboard, panels or the like after installation are taped and spackled to provide a finished wall surface. Any convenient number of brackets of this invention can be employed along the vertical length of the abutting studs, three are shown for the purpose of discussion only, more or less may be desired or required to support the adjacent studs.

The bracket has two outer walls with surfaces which are substantially flush with the vertical studs in the wall structure. One outer wall in larger than the other and includes spanning the open space created by the selected angle between the studs joined and for enclosing a portion of the stud surface. The other outer wall includes only the portion for enclosing an equal length of the studs joined in the same manner as the adjacent portion of the other outer wall. A pair of back walls or stop surfaces form a surface perpendicular to the outer walls that enclose the length of the abutting studs. The back walls or stop surfaces are attached to both outer walls. The bracket provides two open channels with parallel side walls of equal dimensions and a back wall or stop surface which receives an equal length of the end surface of the studs therein at the desired angle therebetween.

An object of the invention is to provide a bracket for positioning and securing two adjacent metal framing studs at a selected relative angle.

Another object of the invention is to provide a bracket for engaging and positioning two adjacent wall studs at a predetermined angle therebetween which provides only a slight increase in the overall stud dimension.

Still another object of the invention is to provide an integral holding bracket for securing together two adjacent wall studs at a predetermined angle therebetween which secures to the studs by friction.

Still another object of the invention is to provide a wall construction stud holding bracket which is fully concealed when the construction is complete.

It is still a further object of the invention to provide a wall construction stud holding bracket which is of a simple, inexpensive design and can be readily applied to a conventional metallic building wall support without requiring tools or special dexterity on the part of the user.

Further and additional objects will appear from the description, accompanying drawings, and appended claims.

DESCRIPTION

Figure 1:
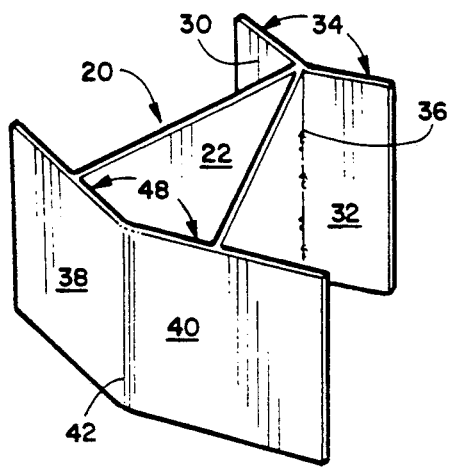
FIG. 1 is a front perspective schematic showing of one embodiment of the bracket of the invention.
Figure 2:
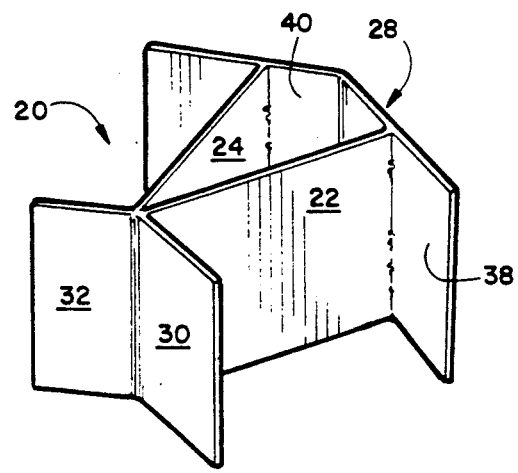
FIG. 2 is a rear showing of FIG. 1.
Figure 3:
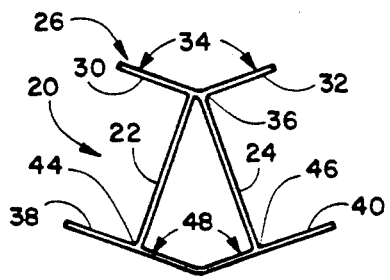
FIG. 3 is a top plan view of the showing of FIG. 1.

Referring now to the drawings and more particularly to FIGS. 1-3, a general schematic representation of the bracket 20 of the invention is shown.

The bracket 20 of FIGS. 1-3 include two inner walls 22 and 24 and two outer walls 26 and 28. Outer wall 26 includes two sections 30 and 32 which form a selected angle 34 therebetween. The inner walls 22 and 24 join the joiner of section 30 and 32 of outer wall 26 at location 36 and are joined by welding, adhesive bonding or the like. The outer wall 28 includes two sections 38 and 40. These two sections are joined together at location 42 to form the outer wall 28. Outer wall section 38 is joined to an end of inner wall 22 at location 44 and outer wall section 40 is joined to an end of inner wall 24 at location 46 in the same manner as described above. The angle 48 formed between wall sections 38 and 40 is equal to the angle 34. This angle is the angle established between the adjacent walls of FIG. 5, hereinafter explained in more detail. The angles between wall sections 30 and 38 and inner wall 22 are 90° as are the angels between wall sections 32 and 34 and inner wall 24.

The distance between wall sections 30 and 38 and 32 and 40 are equal as are the lengths of wall sections 30, 32, 38 and 40. The distances between the opposed wall sections and their length are determined by the dimensions of a metal stud 50 with which they must make a secure friction fit. The length of the wall sections from the inner wall to their distal end will be approximately the width of the stud to be received by the channel. The channel dimensions can vary according to different sized metal studs to be inserted therein.

The angles at 34 and 48 can also be varied according to the adjacent wall angled offsets desired. Angles 34 and 48 of approximately 110° have been used successfully although the bracket of the invention can be used with any practical angle of adjacent wall offset.

Figure 4:
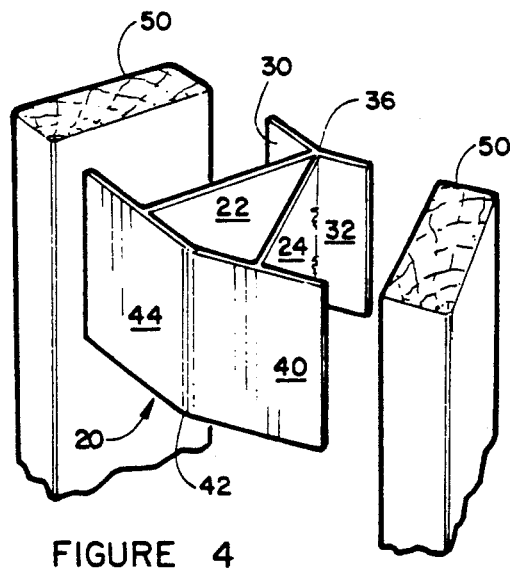
FIG. 4 is an exploded showing of the bracket of FIG. 1 and adjacent metal studs it is designed to position.

Referring now to FIG. 4, this is an exploded showing of a section of two adjacent metal studs 50 and their relationship with the bracket 20.

Figure 5:
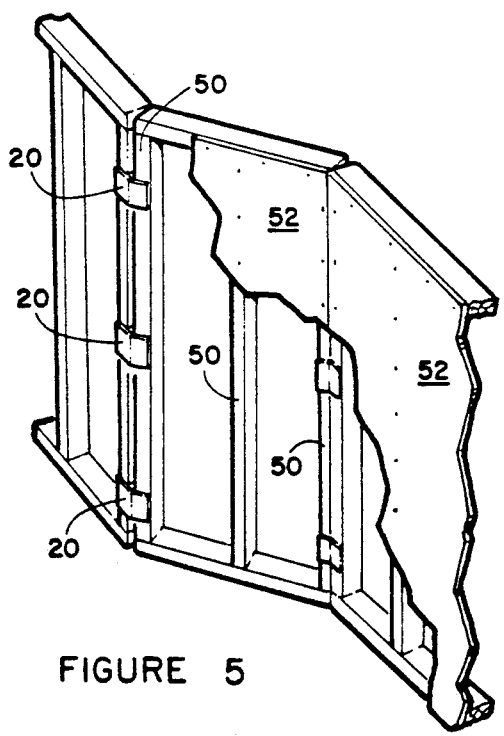
FIG. 5 is a showing of a wall constructed with two offset sections and an intermediate section therebetween employing the brackets.

Referring now to FIG. 5, this showing is a cutaway of wall sections joined together by adjacent studs 50 held in angular position by a plurality of brackets 20, three shown and as hereinbefore mentioned, more or less may be employed. The various metal studs 50 after positioned and secured by brackets 20, as desired, to form the wall skeleton, which is enclosed with wall board, sheet rack, paneling, etc. 52 by conventional finishing methods. To insure a smooth outer wall surface, the wall material 52 must fit uniformly flat along the studs. To insure a uniform fit, the bracket material is sufficiently thin to provide a minimum offset of the overlaying wall material. Obviously the bracket is installed with the larger outer wall at the greater distance between the edges of the joined studs 50. After the wall material is installed over the studs and brackets, it is finished in a conventional known manner by taping and spackling.

Figure 6:
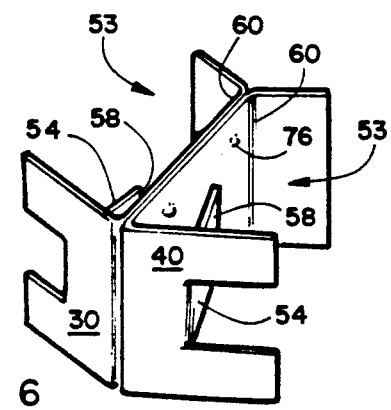
FIG. 6 is a perspective showing of second embodiment of the invention.

The FIG. 6 embodiment is a second embodiment of the bracket of the invention and is constructed of three separate pieces.

The embodiment of FIG. 6 employs the back to back joiner of two separately formed substantially identical "U" brackets 53 having back to back joined walls 56. Stub walls 54 are formed from two parallel cuts in the outer wall sections 30 and 40 and are formed substantially 90° degrees therewith with their end surfaces 58 directed at an angle toward diagonally opposed corner 60. A stud 50 when inserted into the opening in said "U" one end of the stud rests against the folded inward portion and the other end rests against the back of the "U" adjacent the shorter side thereof and is clamped therein and a selected angle is achieved between the studs inserted and held in each "U" portion.

Thus, a novel bracket for metal stud wall construction has been provided wherein erection of angled wall segments can be readily and easily accomplished and no special tools or erectors possessed of special talents are required. The brackets used are of simple, inexpensive design and no way detract from aesthetic appearance of the finished construction.

What is claimed is:

1. A bracket formed from sheet metal for joining together two adjacent vertical metal studs with rectilinear side surfaces having a selected angle therebetween used in forming a skeleton wall, said wall having angled segments therealong formed from a plurality of metal studs, said bracket grips the outer surface of the sides of the studs by a clamping friction fit, said bracket comprising:

a first and second inner wall having distal end surfaces positioned and attached together at one thereof and spaced apart at their opposite distal ends forming an included angle therebetween that is supplementary to said selected angle therebetween;

a first outer bracket wall angled from a central area intermediate the ends thereof extending away from said first and second inner walls, said first and second inner walls being attached at their spaced apart distal ends to said first outer bracked, said first and second brackets being substantially perpendicular to said first outer bracket at their attachment; and a second outer bracket wall angled from said central area intermediate the ends thereof so as to be parallel with a complimentary side of said first outer bracket wall, second outer wall is attached to the opposite distal ends of said first and second holding bracket inner walls forming substantially right angles therewith;

a channel is formed on each side of said bracket by the inner walls and the complimentary adjacent walls of said first and second outer bracket walls, said channels being dimensioned so that when said stud is inserted therein the stud is held fast.

2. The invention as defined in claim 1 wherein the attachment of the first and second outer bracket wall at their inner wall attachment is by welding.

3. The invention as defined in claim 1 wherein the attachment of the first and second outer bracket wall at their inner wall attachment is by adhesive bonding.

4. The invention as defined in claim 1 wherein each one said first and second holding bracket inner walls and a portion of said first outer bracket wall are integral units that when welded together and to second outer bracket wall form said bracket.

5. A sheet metal bracket for joining together two adjacent vertical studs having selected angles therebetween used in forming a skeleton wall, said wall having angled segments therealong formed from a plurality of metal studs, said bracket grips the outer surfaces of the sides of the studs by a clamping friction fit, said bracket comprising:

a first pair of "U" brackets for receiving studs therein one side of which is longer than the other, said pair of "U" brackets being fixedly attached together so that their openings are directed away from each other, the longer side of each of said "U" brackets having a portion of its surface folded inwardly toward the shorter side at an angle of substantially 90 degrees to the longer side surface whereby when a stud is inserted into the opening in said "U" one end of the stud rests against the folded inward portion and the other end rests against the back of the "U" adjacent the shorter side thereof and is clamped therein and a selected angle is achieved between the studs inserted and held in each "U" portion.

* * * * *